P. F. WOLLENWEBER.
GREASE CUP.
APPLICATION FILED MAY 10, 1920.
1,368,675.
Patented Feb. 15, 1921.
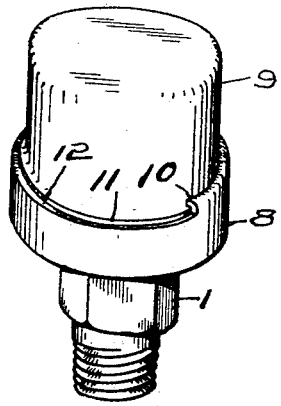
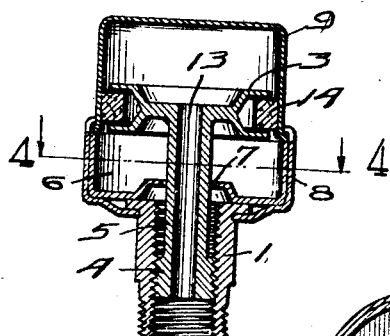
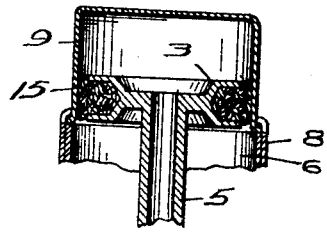
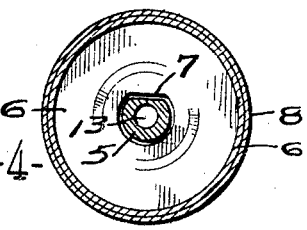
INVENTOR
Paul F. Wollenweber,
by
Owen, Owen & Crampton

UNITED STATES PATENT OFFICE.

PAUL F. WOLLENWEBER, OF TOLEDO, OHIO, ASSIGNOR TO THE K. M. MANUFACTURING COMPANY, OF TOLEDO, OHIO, A CORPORATION OF OHIO.

GREASE-CUP.

1,368,675.   Specification of Letters Patent.   Patented Feb. 15, 1921.

Application filed May 10, 1920. Serial No. 380,053.

*To all whom it may concern:*

Be it known that I, PAUL F. WOLLENWEBER, a citizen of the United States, and a resident of Toledo, in the county of Lucas and State of Ohio, have made an invention appertaining to a Grease-Cup; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide in connection with a readily removable cup a plunger having means for readily adjusting itself to the cup notwithstanding the fact that the cup may be out of circularity and out of alinement with the plunger. The invention has for its object to provide other advantages and features which will appear from the following description and upon examination of the drawings.

The invention may be contained in grease cups of different forms. To illustrate a practical application of the invention I have selected a grease cup containing the invention and shall describe it hereinafter. The grease cup selected is illustrated in the accompanying drawings.

Figure 1 of the drawings is a perspective view of the outside of the cup. Fig. 2 is a sectional view of the cup illustrated in Fig. 1. Fig. 3 is a sectional view of the cup having a plunger of a form slightly modified from that shown in Fig. 2. Fig. 4 is a sectional view taken on the line 4—4 indicated in Fig. 2.

1 is the shank of the cup which is threaded into the bearing part of a machine that is to be lubricated. It is provided with the female thread 2 and the plunger 3 is provided with a slightly enlarged portion 4 having thread that will screw into the shank 1 of the screw cap. The large portion 4 is located on the lower end of the stem 5 of the plunger 3. One side of the stem 5 is flattened and a plate, which may be in the form of the shell 6, is provided with a D-opening 7 through which the stem 5 extends. The shell 6 fits into the outer shell 8. If the member 6 is in the form of a plate it may be secured in any suitable way, as by fitting into the bottom of the shell 8, the object being to securely connect the member 6 with the shell 8. When the shell 8 is rotated it will rotate the stem 5 and cause the plunger 3 to be raised or lowered according to the direction of rotation of the shell 8.

The receptacle for the grease is in the form of a cup 9 which may be filled with grease and inverted and secured to the shell 8. In the form of the construction shown, the shell 8 is provided with an inturned lip 10 that extends a little more than half way around the shell 8. It fits over a flaring edge 11 formed on the cup so that when the cup 9 is to be secured in position on the shell 8 it is pushed along the edge 12 of the shell 8 until it snaps by the ends of the lip 10 whereupon the flaring edge 11 of the cup 9 will be held between the inturned lip 10 and the top of the inner shell 6.

When the cup 9 is to be placed upon the shell 8 the shell 8 is rotated so as to bring the top of the plunger 3 below the level of the edge 12, that is, below the lip 10 so that the cup 9 can be passed across the top of the shell 8 and snapped into position. If then the shell 8 is rotated so as to cause the plunger 3 to be raised the grease within the cup 9 will be forced down through the stem 5, the stem 5 being provided with the passageway 13. The grease is thus forced down into the bearing part of the machine to be lubricated.

Inasmuch as the cup 9 may not conform to a true cylinder or may be slightly out of alinement with the plunger 3, means is provided for permitting the plunger to readily adjust itself to the cup 9. This provision is made for ready adjustment of the plunger 3 relative to the cup 9 at the beginning of the stroke or movement of the plunger 3 into the cup 9 as well as at the completion of the movement of the plunger 3 within the cup 9. This provision consists in the threaded enlarged portion 4 being located only at the lower end of the stem 5. The enlarged portion 4 being relatively short it permits a slight play of the upper end of the stem 5 on which the plunger 3 is located. This is true whether the plunger 3 is located within the shell 8 or is located in the upper end of the cup 9. By this arrangement the plunger 3 will readily swing to a position of substantially axial alinement with the cup 9 notwithstanding the fact that the cup 9 may be slightly displaced with reference to the axis of the shank 1 of the grease cup. This feature is of particular value where the grease cups are made largely of stampings. It avoids the necessity of exact machining in order to produce an exceedingly efficient grease cup.

In addition to the provision for centering the plunger 3 with reference to the cup, the grease cup may be provided with a free floating annular washer 14. The washer 14 is preferably made of a resilient material which is about the size of the cup and so as to tightly fit the interior wall of the cup. The resiliency of the material permits it to conform to the irregularities of the shape of the cup, as for instance if the cup is slightly elliptical or one side protrudes beyond a true cylinder, the washer will conform itself to such irregularities and will moreover shift laterally with respect to the plunger to cause it to readily conform to the position of the cup with reference to the shank 1 of the grease cup. The plunger, however, may be provided with the usual felt washer 15, as indicated in Fig. 3, and the alinement of the plunger being provided for by the location and short length of the threaded portion 4 on the stem 5.

I claim:

1. In a grease cup having a removable cup member, a threaded shank, and a plunger, the plunger raised and lowered by rotation of the cup, the lower end of the plunger stem having an enlarged threaded portion fitting the thread of the shank to permit uniform displacement of the plunger to cause it to be placed in axial alinement with the cup member.

2. In a grease cup having a removable cup member, a threaded shank, and a plunger, the plunger raised and lowered by rotation of the cup, the lower end of the plunger stem having an enlarged threaded portion fitting the thread of the shank to permit uniform displacement of the plunger to cause it to be placed in axial alinement with the cup member, the plunger having a resilient floating ring adapted to conform to the shape of the interior of the cup member and to shift laterally with respect to the plunger.

In testimony whereof I have hereunto signed my name to this specification.

PAUL F. WOLLENWEBER.